G. W. UPTON.
JOURNAL BOX OR FLUE PULLER.
APPLICATION FILED MAR. 31, 1920.
1,363,934.
Patented Dec. 28, 1920.
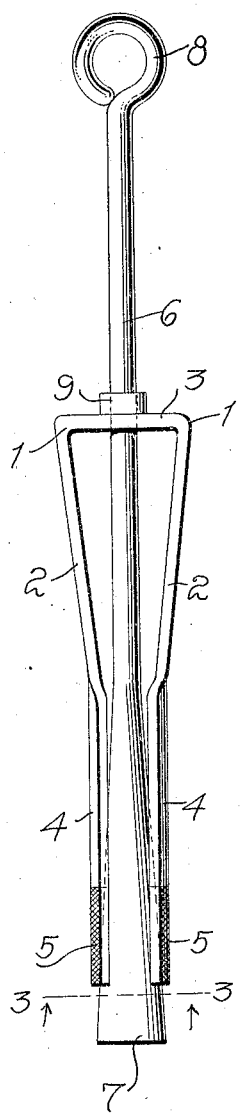
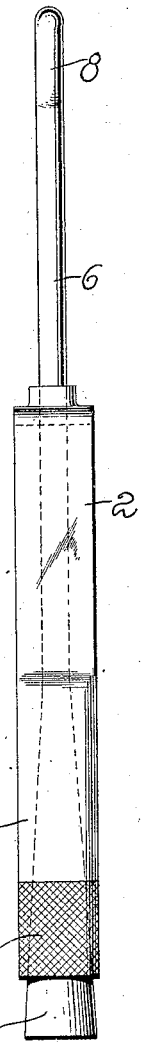
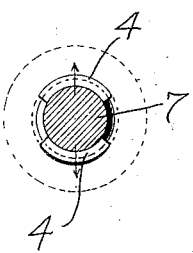
Inventor
Gilbert W. Upton
By Franklin H. Hough
Attorney

UNITED STATES PATENT OFFICE.

GILBERT W. UPTON, OF BECKLEY, WEST VIRGINIA.

JOURNAL-BOX OR FLUE PULLER.

1,363,934.  Specification of Letters Patent.  Patented Dec. 28, 1920.

Application filed March 31, 1920. Serial No. 370,232.

*To all whom it may concern:*

Be it known that I, GILBERT W. UPTON, a citizen of the United States, residing at Beckley, in the county of Raleigh and State of West Virginia, have invented certain new and useful Improvements in Journal-Box or Flue Pullers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to metal working tools and has, more particularly, reference to a tool for extracting journal boxes and bushings.

The object of the invention is to provide a device of this character which is composed of a minimum number of parts, which is strong and durable in use, and which is thoroughly efficient in operation.

Generally speaking, the invention resides in cam or wedge-operated means for frictionally binding against the inner surface of the wall of the journal box or bushing for extracting the same.

The invention is clearly disclosed in the accompanying drawing, in which:

Figure 1 is a view in elevation of my tool.

Fig. 2 is also a view in elevation, taken at right angles to the plane of Fig. 1, and Fig. 3 is a sectional view on the line 3—3 of Fig. 1, looking in the direction of the arrows.

Referring now in detail to the drawings:

A bar of spring metal is bent, as shown at 1, 1, to form converging legs 2, 2, connected at their tops by an integral bridge 3. Said legs, from the free ends thereof to a point which may be substantially intermediate the length thereof, are curved transversely on the arc of a circle, as shown at 4, conforming to the curvature of the wall of the journal box or bushing, in connection with which my tool is used. Said legs 2, 2, are also provided, at their lower or free ends, with exteriorly knurled or serrated portions 5 which function to assist in obtaining a firm grip on the wall of the journal box or bushing to be extracted.

The bridge 3 is apertured centrally the length thereof for the reception of a sliding rod 6 carrying toward its lower end a cone-shaped or cam member 7, constituting a wedge to move the legs 4, 4, outward when the rod 6 is pulled by the operator grasping the handle or eye 8, carried at one end thereof.

The bridge 3 may carry a bearing 9, through which the rod 6 slides, but this bearing is not essential and may be omitted, if desired.

In operation, the tool is inserted in the journal box or bushing to be extracted, with the free ends of the legs 4, 4, projecting thereinto, and the rod 6 is pulled to move the wedge 7 between the legs 4, 4, in a direction to spread the same against the wall of the journal box or bushing, thus obtaining a firm grip on said journal box or bushing, so that the same may be pulled out forcibly.

What I claim to be new is:

A metal-working tool for extracting journal boxes, bushings, or the like, comprising a bar of spring-metal bent to provide converging legs, and a bridge connecting said legs at one end thereof, and a rod slidably mounted in said bridge and carrying at one end a cam for moving said legs outward when the rod is moved in one direction.

In testimony whereof I hereunto affix my signature.

GILBERT W. UPTON.